Feb. 7, 1950 L. L. WHITNEY 2,496,685
BRAKE BEAM
Filed Feb. 1, 1947 2 Sheets-Sheet 1
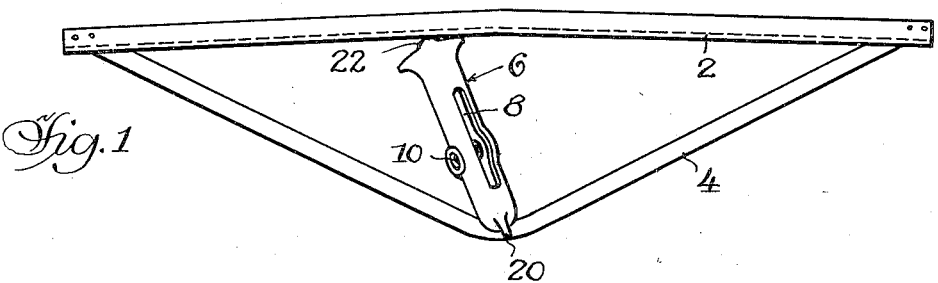
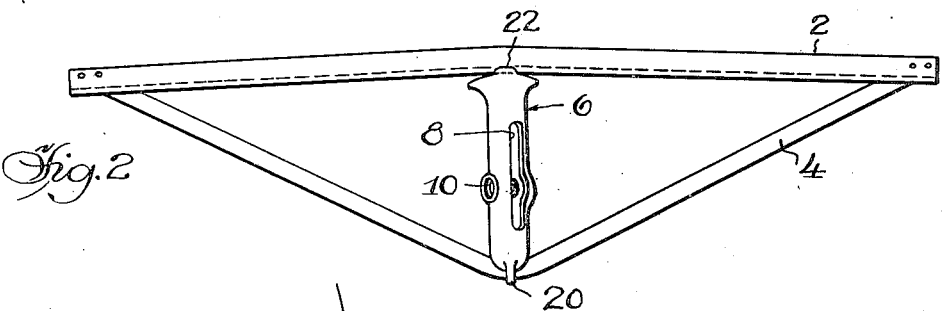
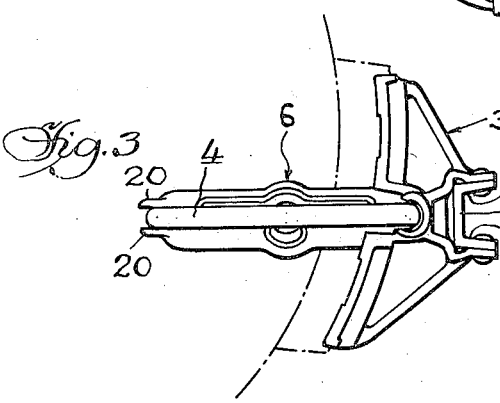
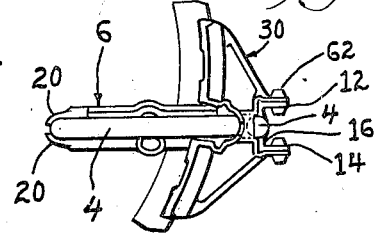
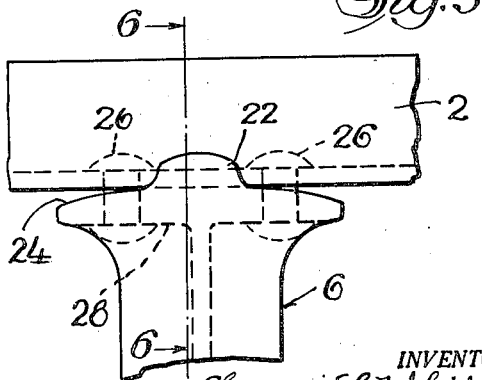
INVENTOR.
Loren L. Whitney
BY
Atty.

Feb. 7, 1950     L. L. WHITNEY     2,496,685
BRAKE BEAM

Filed Feb. 1, 1947     2 Sheets-Sheet 2

INVENTOR.
Loren L. Whitney
BY
Atty.

Patented Feb. 7, 1950

2,496,685

UNITED STATES PATENT OFFICE 2,496,685

BRAKE BEAM

Loren L. Whitney, Hammond, Ind., assignor to American Steel Foundries, Chicago, Ill., a corporation of New Jersey Application February 1, 1947, Serial No. 725,885

3 Claims. (Cl. 188—228)

This invention relates to brake beams and more particularly to a novel truss type railway brake beam and method of manufacturing the same.

A general object of the invention is to design a novel truss type beam which is economical in construction and capable of withstanding the severe stresses of railway service.

Another object of the invention is to provide a compact sturdy truss type beam wherein the connections between the brake heads and the truss structure are readily accessible to accommodate assembly and disassembly of the brake heads.

Another object of the invention is to design a novel brake head having a pocket with offset portions adapted to provide a seat for an associated brake beam compression member, a reinforcing web being formed between the top and bottom walls of the pocket and spaced inwardly from the shoulders to define a passage for the brake beam tension member which is afforded a welded connection to the compression member within the brake head pocket.

Still another object of the invention is to provide a novel brake beam strut which may be economically and efficiently connected between the tension and compression members after the same have been connected at their ends to define a truss structure.

Still another object of the invention is to provide a novel method of manufacturing a brake beam by assembling the strut thereof after the tension and compression members have been connected at their corresponding ends.

The foregoing and other objects and advantages of the invention will become apparent from a consideration of the following specification and the accompanying drawings, wherein:

Figure 1 is a top plan view of the brake beam truss structure showing the manner in which the strut is assembled with the tension and compression members;

Figure 2 is a top plan view of the truss structure with the strut in assembled position;

Figure 3 is an end view of the truss structure with a brake head applied thereto and the fingers on the forward end of the strut in open position;

Figure 4 is a fragmentary end view similar to Figure 3 but showing a modification of the truss structure and showing the strut fingers bent around the tension member;

Figure 5 is a fragmentary enlarged top plan view showing the manner in which the strut is connected to the compression member;

Figure 6 is a sectional view taken on the line 6—6 of Figure 5;

Figure 7:
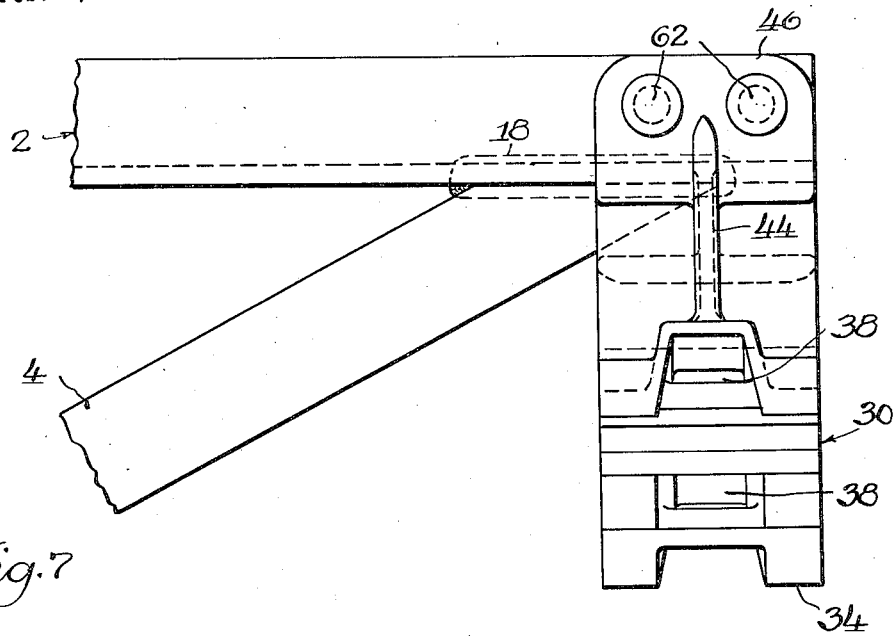
Figure 7 is a fragmentary enlarged top plan view showing the connection of a brake head to one end of the truss structure shown in Figures 1–3.

Describing the invention in detail and referring first to Figures 1–3 inclusive, the brake beam comprises a truss structure including a compression member 2 and a tension member 4 with a strut 6 connected threbetween. The strut comprises a brake level slot 8 extending longitudinally of the strut and a pin opening 10 extending transversely of the strut and intersecting the lever slot to accommodate pivoting of an associated brake lever (not shown) therein by means of a pin (not shown) extending through the opening 10.

Figure 8:
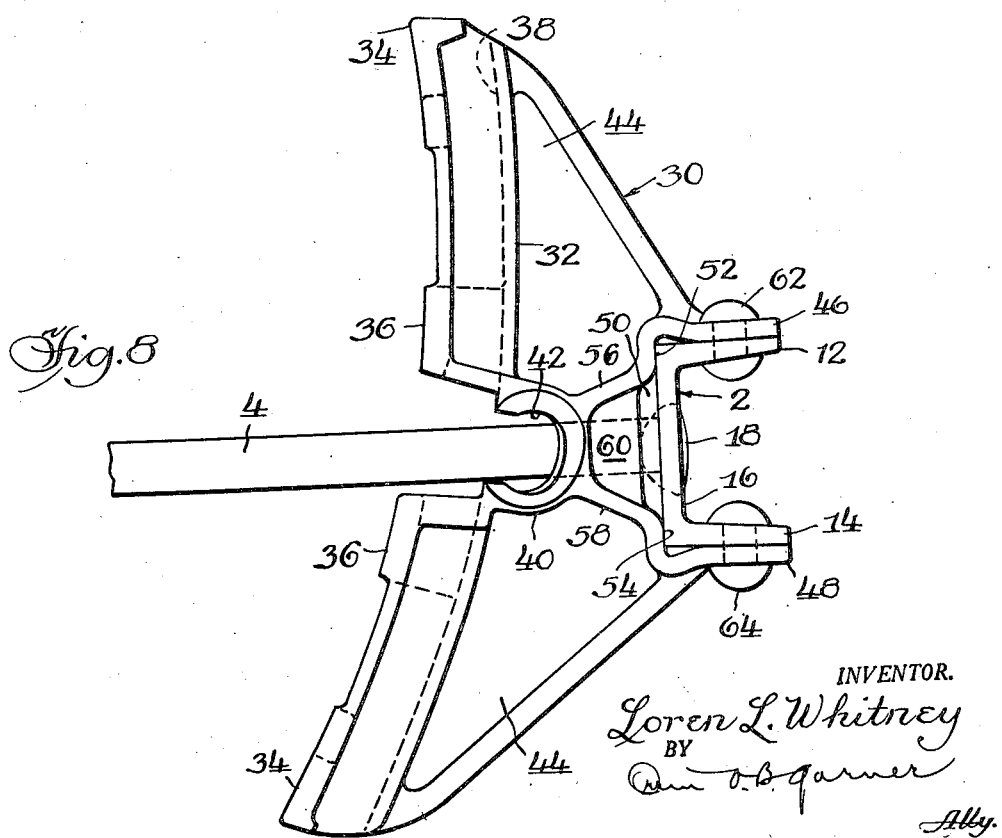
Figure 8 is an end view of the assembly shown in Figure 7.

As will be clearly seen from a consideration of Figures 2 and 3, the compression member 2 is a generally U-section or channel section member with top and bottom webs 12 and 14 and a front web 16 welded to the ends of the compression member 2 as at 18 (Figures 7 and 8).

After the tension and compression members have been welded to define the brake beam truss structure, the strut 6 is diagonally inserted as shown in Figure 1 and is then rotated in the plane of the truss to the assembled position shown in Figure 2 on the transverse center line of the truss, with the top and bottom fingers 20 (Figure 3) of the strut receiving the tension member 4, and top and bottom lugs 22 (Figures 2, 5 and 6) embracing the compression member 2. It may be noted that the rear surface of the strut 6 is preferably arcuately formed as at 24 to accommodate rotation of the strut into its assembled position as the surface 24 slides against the forward web 16 of the compression member. After the strut 6 has been rotated to the position shown in Figure 2, the fingers 20 are bent into clamping engagement with the tension member 4, as shown in the modification of Figure 4, and the web 16 is riveted as at 26 to the rear web 28 of the strut, as best seen in Figures 5 and 6.

A brake head, generally designated 30, is then applied to each end of the truss structure, as shown in detail in Figures 7 and 8. The brake head 30 comprises a front wall 32 with end lugs 34, intermediate lugs 36, and a keyway 38 affording connection in the conventional manner to associated brake shoe means (not shown). The front wall 32 is formed intermediate its ends with a transversely extending arcuate wall 40, as best seen in Figure 8, defining a hanger socket 42. A rear, substantially vertical wall 44 is integrally formed with the front wall 32 and is formed with top and bottom walls 46 and 48 defining a pocket 50 for the reception of the tension and compression members, the walls 46 and 48 being offset as at 52 and 54 to afford shoulders against which the forward web 16 of the compression member is seated. The offset portions of the walls 46 and 48 converge as at 56 and 58 to merge with the arcuate wall 40. A vertical web or wall 60 extends between the offset portions 56 and 58 of the walls 46 and 48 and also merges with the transverse wall 40 to afford a compact, sturdy structure in which the rear edge of the web 60 and the forward edge of the compression member web 16 define a passage accommodating the outboard extremity of the tension member 4, which, as above noted, is afforded a weld as at 18 to the compression member 2 within the pocket 50 and extending inboardly thereof. The brake head wall 46 is riveted as at 62 to the compression member web 12, and the brake head wall 48 is riveted as at 64 to the compression member web. 14.

Referring now to Figure 4, a modification of the truss structure is shown wherein the tension member 4 is bent at its outboard end to form an extremity extending substantially parallel to the compression member web 16 and received within a complementary slot therein prior to welding. This structure is otherwise substantially identical to that shown in Figures 3, 7 and 8 and corresponding parts are identified by numerals corresponding to those of said figures. The structure shown in Figure 4 is a particularly sturdy one, in that a relatively great weld area is afforded at the top and bottom of the tension member extremity at opposite sides of the slotted compression member web 16 above and below the slot therein. Furthermore, in this construction, the connection between the tension and compression members is relatively close to the longitudinal or neutral axis of the compression member, thereby affording a particularly strong truss. It may be noted that in Figure 4 the strut fingers 20 are shown bent around the compression member in the final assembled position of the strut.

Thus, it will be understood that I have provided a novel truss type beam wherein the connections between the brake heads and the truss structure are readily accessible from the back or rear portion of the beam, as well as from the ends thereof, to facilitate assembly and disassembly of the brake heads. Furthermore, the above-described structure is unusually compact and sturdy in that the brake head pocket is particularly adapted to accommodate the tension member which is welded to the compression member at a point within the brake head pocket. Also, the strut 6 and the manner of assembling the same with the truss structure is adapted to afford an economical construction which may be readily fabricated without the use of complicated jigs to hold the various parts in position during assembly of the beam.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. A brake beam comprising a truss having a compression member with a front web and top and bottom webs projecting rearwardly therefrom, and a tension member having an extremity extending approximately parallel to said front web within a slot therethrough, said tension member extremity being welded at the top and bottom thereof to said front web along the front and rear surfaces thereof above and below said slot, whereby said extremity is disposed adjacent the longitudinal axis of said compression member, and a brake head carried by the truss.

2. A brake beam comprising a brake head including a front wall with securing means for associated brake shoe means, a rear wall projecting angularly from said front wall, top and bottom walls merging with said rear wall to define a pocket, a compression member comprising a front web in said pocket and top and bottom webs projecting rearwardly from said front web and secured to said top and bottom walls, a tension member projecting into said pocket and welded to said front web therewithin, and a vertical web in said pocket spaced from said front web and defining therewith a passage within which the outboard extremity of said tension member is disposed.

3. A brake beam comprising a truss including a U-section compression member with a front web and top and bottom webs projecting rearwardly therefrom, and a tension member having a bent extremity extending approximately parallel to said front web within a slot therethrough, said tension member extremity being welded at the top and bottom thereof to said front web along the front and rear surfaces thereof above and below said slot, whereby said extremity is disposed adjacent the longitudinal axis of said compression member, and a brake head secured to said truss.

LOREN L. WHITNEY.

REFERENCES CITED

The following references are of record in the file of this patent:

UNITED STATES PATENTS

| Number | Name | Date |
|---|---|---|
| 679,759 | Lanz | Aug. 6, 1901 |
| 850,335 | Baker | Apr. 16, 1907 |
| 902,138 | Crone | Oct. 27, 1908 |
| 949,892 | Harrison | Feb. 22, 1910 |
| 996,632 | Forsyth | July 4, 1911 |
| 2,112,467 | Meadows | Mar. 29, 1938 |
| 2,116,594 | Busch | May 10, 1938 |
| 2,239,186 | Anderson | Apr. 22, 1941 |
| 2,314,978 | Gunn | Mar. 30, 1943 |